United States Patent [19]

Tsakanikas

[11] Patent Number: 5,570,465
[45] Date of Patent: Oct. 29, 1996

[54] APPARATUS, METHOD AND SYSTEM FOR PRINTING OF LEGAL CURRENCY AND NEGOTIABLE INSTRUMENTS

[76] Inventor: Peter J. Tsakanikas, 3080 N. Course Dr. Bldg. 51, #108 Palm-Aire Country Club of Florida, Pompano Beach, Fla. 33069

[21] Appl. No.: 230,254

[22] Filed: Apr. 20, 1994

Related U.S. Application Data

[63] Continuation-in-part of Ser. No. 174,688, Dec. 28, 1993, abandoned, which is a continuation-in-part of Ser. No. 94,905, Jul. 22, 1993, abandoned.

[51] Int. Cl.⁶ ............................ G06F 15/00; H04M 11/00
[52] U.S. Cl. ........................ 395/114; 395/117; 379/75
[58] Field of Search ................. 179/2; 395/117, 395/111, 115, 105; 379/144, 91, 100; 234/463; 364/401

[56] References Cited

U.S. PATENT DOCUMENTS

| | | | |
|---|---|---|---|
| 3,647,973 | 3/1972 | James et al. | 179/2 |
| 4,427,848 | 1/1984 | Tsakanikas | 179/2 |
| 5,075,862 | 12/1991 | Doeberl et al. | 395/117 |
| 5,075,875 | 12/1991 | Love et al. | 395/117 |
| 5,157,717 | 10/1992 | Hitchcock | 379/144 |
| 5,166,500 | 11/1992 | Yoon et al. | 235/463 |
| 5,239,622 | 8/1993 | Best et al. | 395/117 |
| 5,255,312 | 10/1993 | Koshiishi | 379/100 |
| 5,295,181 | 3/1994 | Kuo | 379/100 |
| 5,299,295 | 3/1994 | Kim et al. | 395/111 |
| 5,323,448 | 6/1994 | Biggs | 379/91 |

*Primary Examiner*—Mark R. Powell
*Assistant Examiner*—Steven P. Sax

[57] ABSTRACT

A global network computer system to print legal currency and/or negotiable instruments at a designated location by the input of information to the global network computer system from a remote location. The global network computer system can receive the input information from a telephone handset or terminal using a technique of selective generation of signals. Output signals from the global network computer can be sent to designated facsimile machines, laser printers, telecopiers or automated teller machines for printing the legal currency or negotiable instrument. The global network is also capable of storing and tracking greenback currency provided with a unique barcode.

23 Claims, 8 Drawing Sheets

APPARATUS, METHOD AND SYSTEM FOR PRINTING OF LEGAL CURRENCY AND NEGOTIABLE INSTRUMENTS

RELATED APPLICATIONS

This application is a continuation in part of U.S. patent application Ser. No. 08/174,688, filed on Dec. 28, 1993, which is a continuation in part of No. 08/094,905, filed on Jul. 22, 1993, both abandoned.

BACKGROUND OF THE INVENTION

The present invention generally relates to systems for printing legal currency and negotiable instruments. More particularly, the invention is directed to a global network computer system which can be accessed from a remote location and can print legal currency or negotiable instruments at the same or at a different remote location. The present invention also relates to methods for unique identification and redemption of centrally printed negotiable instruments, including greenback currency with printed indicia.

In recent years, the use of computer systems in transferring funds from one account to another has spread widely and has become the standard procedure for banking operations. In addition, access to computer systems via telephone connections by home computer systems has increased significantly. Computer systems in common usage by banks and other financial institutions include Automated Teller Machines enabling the user to perform a limited number of financial transactions. These computer systems are able to dispense legal currency and debit the user's account in the corresponding amounts. Some of these computer systems further include a networking means for accessing accounts in different banks or financial institutions, to debit and credit the accounts, check balances, and the like.

The Automated Teller Machines and the computer systems associated therewith are typically used by the general public for withdrawing cash at the location of the machine without the need for a teller. Automated Teller machines have the disadvantage of requiring daily maintenance and re-supplying with cash. In addition, the machines are subject to vandalism and theft, resulting in substantial financial losses.

The use of the Automated Teller Machines by the bank customers also is limited by the availability of the machines. Many banking computer systems are limited to well defined geographic areas so that the customer is not able to withdraw cash or conduct other business while traveling. Traveling in different countries further compounds the difficulties in obtaining cash and making foreign legal currency conversions. Also personal security is becoming of great concern relative to the use of ATM machines in public places.

Another disadvantage of conventional cash is its use in illegal business transactions. The current invention eliminates the use of traditional cash and provides an audit trail for all Fax Cash™ transactions. The wide spread adoption of the current invention will serve to eliminate drug and other forms of illegal trade which in turn will eliminate drug related crime.

The computer systems of banking and financial institutions have not provided adequately for the customer needs in offering a computer system which can readily supply cash, checks or other negotiable instruments at a location of choice selected by the user. Several computer systems and programs are available to enable personal computers to conduct business at remote locations.

Other systems enable the user to access a computer system via a keypad such as a touch-tone telephone keypad. The keypad is used to enter both alpha and numeric data and has been taught in several patents held by the current inventor, Tsakanikas. These patents are U.S. Pat. Nos. 3,381,276, 3,618,038, 3,647,973, and 4,427,848 which are incorporated herein by reference. The current invention employs the technology taught in these patents as part of a communications system. The technology disclosed is not limited to a conventional touch-tone telephone keypad.

Various specific prior art techniques for developing a multiplicity of discrete control and data signals utilized for the transmission of alphabet characters, numeric and data control information from a keypad are described below. A particular embodiment of the current invention may use any number of these techniques. The descriptions are written relative to the printed characters on a transaction terminal or touch-tone keypad. The techniques described easily can be applied to any form of keypad. For example the keypads of an ATM, a facsimile machine, a cellular phone, or a transaction terminal are very similar to a touch-tone keypad. The word "keypad" is used in these specifications to denote a data entry device distinct from a keyboard in that less than 26 keys are used to enter alpha characters.

A conventional touch-tone telephone or transaction terminal has 12 buttons. These buttons are arranged in four horizontal rows and three vertical rows. While this arrangement sometimes comprises 16 buttons, or even more sophisticated designs, without departing from the concept of this technique, it is helpful to consider the arrangement as now commonly used to facilitate an explanation and further, to demonstrate the manifest simplicity and applicability to the production of a number of discrete information signals far exceeding the number of "push buttons" provided on the hand-set.

Figure 3:
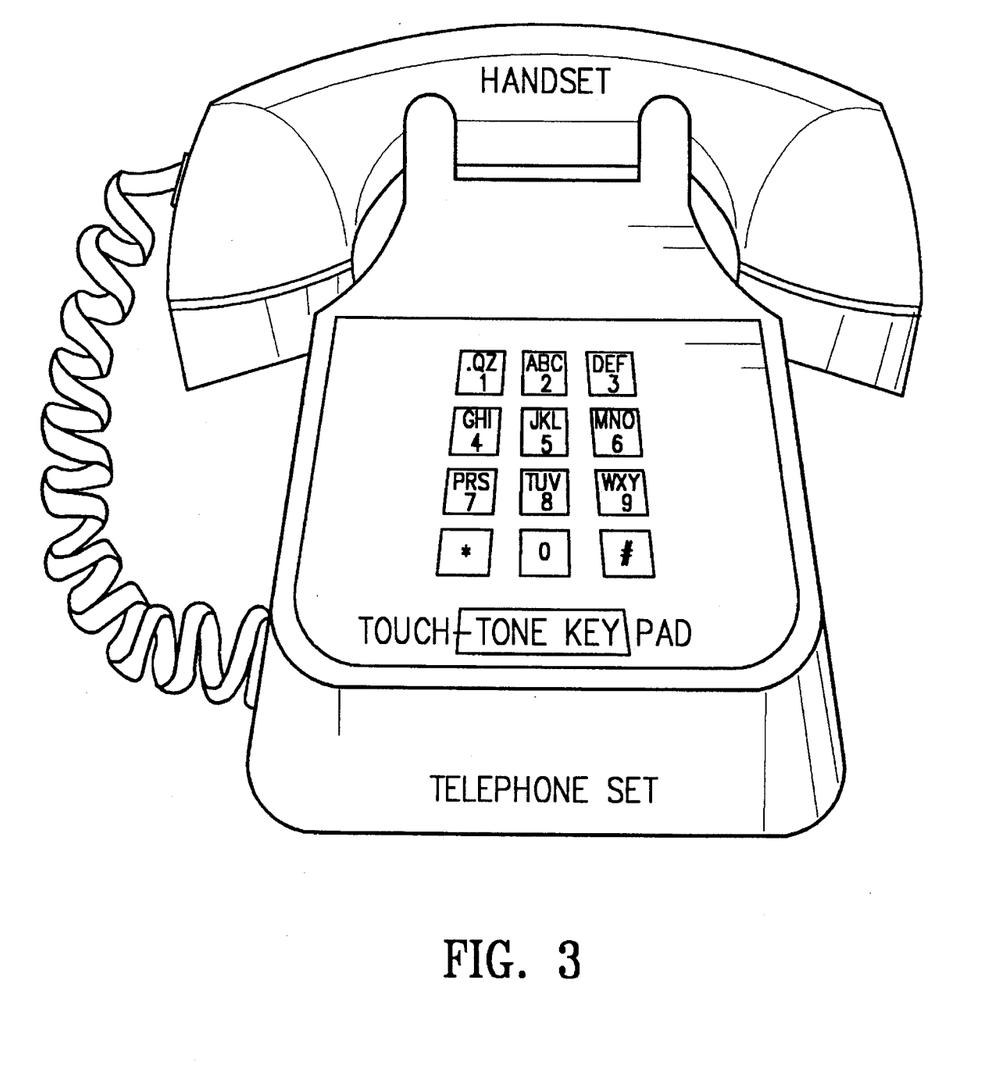
FIG. 3 is a line diagram of a Touch-Tone telephone set.

With the existing arrangement, for example, the four horizontal rows of push buttons include 1-2-3, 4-5-6, 7-8-9, and 0, respectively, FIG. 3. The three vertical rows include 1-4-7, 2-5-8-0, and 3-6-9, respectively. The buttons further include letters of the alphabet with the exception of the letters Q and Z. In this invention the period "." and the letters Q and Z are assigned to the "1" button in the order listed.

The first of six data entry techniques described is the Count Along the Button Entry Mode (CAB) which was first disclosed in U.S. Pat. No. 4,427,848. This particular CAB mode was designed as the fastest means of data entry with the fewest number of key strokes. The # key will invoke the "enter numbers only" feature. The "2" through "9" keys are assigned to transmit the numbers and letters printed thereon. The "1" key is assigned the ".", "Q" and "Z" codes. The "0" key is assigned the ",", "go to features levels", "space" and "shift upper/lower case" codes.

The numbers are entered directly, after selecting the # key. The three letters that are on each key are sequenced on a key-by-key basis, and not for the entire key pad as is common with other modes. The letters are selected by successive key depressions. The first, second or third letter of each key are accessed by pressing one, two, or three strokes on that particular key. The selected letter on the particular key is sent as soon as any other key is depressed. For example, two strokes on the "2" key will select the letter "B". However, the letter "B" is not sent until another key is depressed.

This mode is fast and easy to use and competes with most other modes since the user only needs to select the letter without depressing a separate "enter" key. Transmission of the letter occurs automatically when the user begins selecting the next letter. The # or the * key may still be used as the "enter" key.

When two letters from the same key are required, the first desired letter of the particular key is first selected by successive sequential strokes followed by a stroke of the # key to send the first desired letter. Although depressing any other key also will send the letter, the first letter of that key will be selected for the next transmission.

Since the selected letter is sent after another key is depressed, direct audio response may be cumbersome and confusing. In preferred embodiments of this mode, audio response is relative to one or more words rather than to each letter, when it is used.

The key strokes required to enter "2Q CATS" in the CAB mode are as follows:

| | |
|---|---|
| 1. # | (number mode) |
| 2. 2 | (2 is entered) |
| 3. * | (alpha mode) |
| 4. 11 (two Times) | (Q is selected) |
| 5. 222 (three times) | (Q is entered and C is selected) |
| 6. * | (C is entered) |
| 7. 2 | (A is selected) |
| 8. 8 | (A is entered and T is selected) |
| 9. 777 (three times) | (T is entered and S is selected) |
| 10. * | (S is entered) |
| 11. # | (may be used to signal that the current entry is complete) |

The data entry mode referred to as the Modified Count Along the Button Data Entry Mode is next described. It was first disclosed in U.S. Pat. No. 4,427,848. In this mode, for example, the * key is used to sequence the letters in a manner similar to that described above. The # key will invoke the "enter numbers only" feature. Sequential strokes of the * key will sequence the letters.

The data entry technique is similar to the previously described mode. Numbers are entered directly after selecting the # key. Sequencing the letters is performed by successive strokes of the * key. Pressing one stroke of the * key causes the first letter on each number key to be ready for transmission when a number key is depressed. A second sequential stroke of the * key will sequence the key pad to the second letter position. A third sequential stroke of the * key will sequence the keypad to the third letter position. Another stroke of the * key will sequence the keypad to a fourth position or back to the first position. Any number of keys may be pressed between strokes of the * key. Each stroke of a number key will transmit the letter that corresponds to the number of sequential strokes of the * key that have been pressed at that time. Selecting the # key will reset the letter sequencer to its first position along with changing to the "enter number only" mode. This allows the # key to be used as a letter sequencer reset should the user wish to quickly return to the first position.

Another data entry mode is referred to as the Relevant Character Data Entry Mode and was first disclosed in U.S. Pat. No. 4,427,848. This mode can be used as a default mode since it offers a simple (Quickey™) method of alphanumeric data entry for short messages. In this mode the # key will invoke the "enter numbers only" feature. A short stroke (e.g. under 240 milliseconds) of the * key will invoke the "enter letters only" feature. A long stroke (e.g. 240 milliseconds or longer) of the * key will cancel the last character that was entered in the buffer. Successive long strokes of the * key will cancel the entire last word, sentence or the entire buffer memory.

The "2" through "9" keys can transmit the number and letters that are printed on them. The "1" key is assigned the period "." and the letters "Q," and "Z" in that order. The "0" (OPER) key is assigned in addition to "0" any or all of the following: "space between words," "go to command feature level," and "verify last character".

Using this technique, the numbers are entered directly after selecting the # key. Letters are sequenced on each key by selecting a combination of short and long key strokes. The operating system measures periods of inactivity following a short key stroke and will interpret them as a long key stroke. This will be referred to for the remainder of this discussion as a computer signal. A long key stroke or computer signal enters the letter, while a short key will shift the selector to the next letter. For instance, two short strokes followed by a long stroke or signal on the "2" key will transmit the letter "C." One long stroke or computer signal on the "2" key will send the letter "A." The sequencer is set back to the first position each time a long stroke or key is engaged. For example, to enter "2 CATS," one simply presses the # key followed by the "2" key. Then a stroke on the "0" key to designate a space. Then two short and a long on the "2" key will send the letter "C". A long stroke or computer signal on the "2" key will send the letter "A". A long stroke or computer signal on the "8" key will designate the "T". Two short strokes followed by a long stroke or computer signal on the "7" key will designate the "S".

The Twin Depression Technique makes use of some properties of the tones generated by a touch tone keyboard. This technique was disclosed in U.S. Pat. Nos. 3,381,276 and in 3,647,973.

The operation of a touch-tone keyboard, for example, is such that for any button pushed or otherwise actuated a Dual Tone Multiple Frequency (DTMF) is produced at the output. The frequencies developed can be considered to correspond to row and column numbers. For example, A1 represents the frequency component common to first horizontal row, A2 the second horizontal row, A3 the third horizontal row and A4 the fourth horizontal row. Also B1 represents the frequency component common to the first vertical column, B2 the second vertical column, and B3 the third vertical column. Then, when push-button 1 is depressed, frequency components A1 and B1 are simultaneously produced. Frequency component A1 appears in the first horizontal row, and frequency component B1 appears in the first vertical column. The intersection of the first horizontal row with the first vertical column is push-button 1. When push-button 2 is depressed, frequency components A1 and B2 appear on the output. Push-button 2 is in the intersection of the first horizontal row and the second vertical column. There are two frequency components simultaneously produced at the output of the telephone handset for any single depression of a given push-button number 0 through 9, plus an * or # button. These are known as harmonic frequencies. Other keyboards that do not produce tones can still use these general principles to generate or otherwise discriminate unique signals.

The twin depression technique makes use of the foregoing and further realizes the potential of producing differing signals than that above described in the event that two or more push buttons are depressed simultaneously in a horizontal row or vertical column. Eight discrete signals or frequencies are obtained depending on the number and arrangement of buttons that are simultaneously depressed. Simple computer control consistent herewith merely requires simultaneous depression or other actuation of two or more buttons in rows or columns. More particularly, it has been found that with the conventional touch-tone telephone handset, simultaneous depression of two or more buttons in any given row causes but a single discrete frequency component to appear at the output of the telephone handset. For example, if two push buttons corresponding respectively to the numerals 5 and 8 were simultaneously depressed, or otherwise actuated, only frequency component B2 would appear on the output of the telephone handset and thus be transmitted along the interconnection line. Frequency components A2 and A3 would not be present. When two push buttons corresponding respectively to numerals 2 and 3 are simultaneously depressed, the frequency component A1 appears while frequency components B2 and B3 do not appear.

This procedure provides a technique which, as mentioned above, utilizes this capability to produce both command or control as well as alphanumeric data input signals to a computer.

It is important to realize that in accordance with the above description, any given piece of data, whether it be alphabetical or numeric or in any language, and any given instruction or command signal can be represented by an instantaneous single output signal produced by the proper twin depression or other actuation of two or more of the push buttons existing on a standard push-button or "Touch-Tone" telephone handset. For instruction or command signals, the single output signal may consist of only one signal or frequency component according to the above example. Whereas for alphanumeric data input, the single output signal may consist of two frequency components which, while harmonic in nature, are instantaneous. Obviously, a "reverse" logic also may be used wherein a signal output of one frequency component represents data information and a signal output of two frequency components represents command information. This single signal technique permits a user of the system to perform only one operation for each piece of data and for each command given to a computer. Furthermore, this technique can yield a virtually unlimited number of single or multiple discrete output signals which can be produced merely by varying the number and particular button or buttons depressed or actuated.

A further data entry technique is the Straight Pass Through Data Entry Mode disclosed in the Comput-A-Talk™ Users Manual, ©1982, Telephone Computer Company. This particular mode is designed to be plug compatible with most conventional audio response systems using the Touch-Tone telephone as the input keyboard. This data entry method permits the pass through of the 12 dual tone signals generated by pressing a Touch-Tone key. The additional four available DTMF harmonic tones when a fourth column of keys is used are converted to ASCII A, B, C and D respectively. The raw Touch-Tone signals are passed through without any translation. However, the straight pass through technique does convert the Touch-Tone signals into bona fide ASCII codes.

When a key is depressed longer than 240 milliseconds, 128 is added to the ASCII value transmitted from the system to a computer. For example, a short depression of the "1" key transmits an ASCII "1" (Decimal 49) while a long depression of the "1" key transmits an 8 bit binary number corresponding to ASCII "1"+128 (or 177 decimal). The straight pass through technique converts the Touch-Tone signals (#, *, 0–9) into bona fide ASCII equivalents of the #, *, 0–9.

The final data entry technique described is the Delayed Depression Data Entry Mode and is the subject of U.S. Pat. No. 3,618,038. This mode allows the user to transmit most of the 128 characters defined by the ASCII standard including all of the numbers, the upper and lower case letters, and 30 punctuation marks and symbols. The # key will invoke the "enter numbers only" feature. A short stroke of the * key will cause the device to give a verbal verification of the last character that was entered. Successive long strokes of the * key will cancel the last character, word, sentence or entire memory buffer.

In this mode, the keyboard assignments will depend on the portion of the ASCII code that has been chosen for transmitting. Each key is assigned ten different characters. Numbers are entered directly after selecting a long # key stroke. Letters, punctuation, and numbers are chosen by pressing long strokes on the "1" through "9" buttons. A long stroke of the "1", "2," and "3" choose respectively the upper case first, second and third letters of each such additional numeric key. A long stroke of the "4", "5" and "6" keys select respectively the lower case first, second, and third letters of each subsequent key. A long stroke of the "7", "8" and "9" will each assign a different punctuation and special character set to the keyboard. Long depression of keys "0" through "9" may be used at any time during data entry, to select a different character or function set for transmission of desired data by short depressions of keys "0" through "9." The value that is transmitted by any short key depression will be defined by the last long key depression.

These systems effect automatic remote control of a computer or computer device through keypads and telephones using the keypad instead of a computer keyboard. These keypad techniques provide for a selective generation of a plurality of output signals. These output signals are decoded and then encoded by a programmed translator device in a manner so as to effect operation of any desired computer mechanism at any location. These prior art systems, however, do not provide a means for dispensing legal currency or negotiable instruments at a desired location.

BRIEF SUMMARY OF THE INVENTION

An object of the present invention is to provide a global computer network system to facilitate the designation, transfer, creation and printing of legal currency and negotiable instruments over any form of communication lines including narrowband and broadband global communication networks.

The present invention is directed to a global computer network system and process for printing and dispensing legal currency or negotiable instruments at a local or remote location using existing communications lines as a means for accessing a central computer. This global networked computer system, of the invention, is able to access a centralized computer system using a keypad such as a conventional Touch-Tone telephone, computer keyboard, or other data entry system. A centralized computer system 22, as part of the global network, is able to access secondary computer networks such as banks, foreign exchange networks, government financial agencies, and credit agencies from a remote location. By entering the appropriate access codes and personal identification numbers, instructions to transfer funds from debit or credit accounts can be made. A centralized computer system 22, as part of the global network, is able to print requested documents at a designated location which can be either the same or different than the data entry system location.

In a particularly preferred embodiment of the invention, the global network computer system is able to access a desired government treasury department and obtain authority to print or otherwise reproduce legal currency or other government issued documents. The computer system will debit the appropriate account and enter or record any other essential internal information required by the system. Computer output signals will then be transmitted to a designated printer at any desired location to print the legal currency.

The advantages of the invention basically are attained by a global network computer system comprising a keyboard means having a plurality of keys thereon for producing signals, a logic circuit including a digital converter for converting to digital signals, a central computer for receiving and processing information from the keyboard, a second logic circuit for converting the processed information into supervisory electrical or digital signals and a printer for receiving the supervisory or digital signals to produce the document.

The apparatus of the invention for transferring and printing legal currency and negotiable instruments at a local or remote location is a computer mechanism which processes data information in response to command information by means of a data entry system such as a supervisory electrical, or digital terminal, or a tone generating telephone set having a plurality of keys thereon operative when actuated individually or in sequential groups to produce signals having supervisory, digital or frequency characteristics corresponding to the particular key or keys depressed and operative when actuated in said groups to produce signals.

The method comprises actuating the keys individually and sequentially to produce signals representing input information corresponding to a legal currency or negotiable instrument to be printed; translating the signals into computer commands and data control signals; feeding the computer commands and data control signals to the computer mechanism in a sequence to cause the computer mechanism to process the data information in accordance with the command information, and produce output control signals corresponding to the designated legal currency or negotiable instrument.

The system monitors the computer mechanism by sending supervisory electrical, digital signals or audio tones to the terminal or telephone set indicative of the operation of the computer mechanism in response to the computer command and data control signals. The output control signals are translated into printing signals and routed to a printer unit designed and designated for printing the legal currency or negotiable instrument.

The primary purposes of these innovations are to eliminate excessive fraud and illegal activities associated with the many areas including but not limited to illegal drug trafficking, food stamp fraud, check fraud, theft including stealing of airbags and other auto parts. An additional benefit is to provide society with a higher quality of living by eliminating the rampant crime and assault on persons dealing with the desire or lust to get money illegally. A higher quality society would exist if we use today's technology for crime busting. These technologies include computer science and new and novel banking technologies working with telecommunication in order to solve many problems and crimes which currently exist in our society.

A further embodiment of the present invention involves the tagging of conventional legal currency i.e. greenbacks, with unique indicia. This embodiment is accomplished by adding a bar code that contains specific identifying information relating to the serial number of the money issued, the date and place it was printed by the Bureau of Engraving or foreign counterpart, the control number, if any, the place of engraving, the denomination of the money, and any other information relating to the issuance of the money and maintaining a record of each assigned bar code. The introduction of bar coded money will accomplish all of the suggestions that previously were proposed regarding the changing of the color of greenbacks to red, without actually effecting the color change. Embedding bar codes on greenbacks accomplishes this while preserving the nature and the appearance of money. However, in order to have this accomplished new legislation would have to be passed making conventional uncoded greenbacks obsolete.

The need to have the Bureau of Customs and Immigration equipped with optical scanning capability is most important. Currently there is more than $20 billion a year stolen out of our society by drug lords and one of the main objectives of this invention is to eliminate illegal drug trafficking and to break the bank of drug lords. It is anticipated that for the implementation and success of eliminating crime, the Customs and immigration Point of Entries would scan the embedded new bar code money and only new bar coded money would be permitted to leave the U.S., and accordingly only new bar coded money would be permitted to be brought into the U.S. Therefore, once legislation is passed, any existing conventional greenback money would have to be exchanged for new bar coded money at the Customs and immigration Point of Entries.

The primary purpose of having a machine readable or optically scannable bar code is so that at a Point-of-Sale (POS) or at a point of entry into the U.S. or exit from the U.S. to any other country, the new bar coded money could be optically scanned and read into computer memory to identify where in the circulation stream the new bar coded money is at any point in time. The need to know where money is as it circulates in our society, not only in U.S., but worldwide, is to permit the money to be traceable to deter criminal activity.

For example, the currant practice of laundering money can be described as follows: An illegal drug pusher selling narcotics on the street currently gets conventional cash which is laundered through various illegal establishments for the benefit of the drug lords that desire to have clean and untraceable cash or money. Using the new bar coded money, the authorized federal government agencies of a government such as FBI or Secret Service would be able to set up "stings" that would eventually identify the laundering establishments that currently exist in the U.S. and other foreign countries. For example, the Secret Service could use the existing technologies that are used in the credit card industry which permit reverse account matching. There are existing credit bureaus that can send back identifying data base information merely based on a bar code identification number utilizing these reverse account matching technologies to fight crime. Additionally, new laws would have to be developed so that no unauthorized person or entity would utilize this vital information, as it should only be utilized by authorized law enforcement agencies. For example, the Secret Service, when deciding to engage in a sting on illegal drug trafficking in an specific area, could issue and pay for drugs with bar coded money so that at any point in the future when the bar coded money is scanned, it could be identified as the money that was used in the sting. Then through the use of computer reverse account matching technologies, the appropriate law enforcement agency, such as the Secret Service, would be able to observe where the sting money is in circulation in our society.

BRIEF DESCRIPTION OF THE DRAWINGS

Referring now to the drawings which form a part of this original disclosure.

DETAILED DESCRIPTION OF EXEMPLARY EMBODIMENTS OF THE INVENTION

The invention is primarily directed to a global network computer system and process for producing documents in the form of printed legal currency and/or negotiable instruments at a location remote from a centralized computer system 22, as part of the global network, and either remote from or located at the station where the data or information is entered into a centralized computer system 22, as part of the global network. The legal negotiable instruments or legal currency may be printed by a conventional facsimile machine, laser printer, automated teller machine printer, or other printing machine having the capability to produce the desired legal currency or negotiable instrument.

Figure 1:
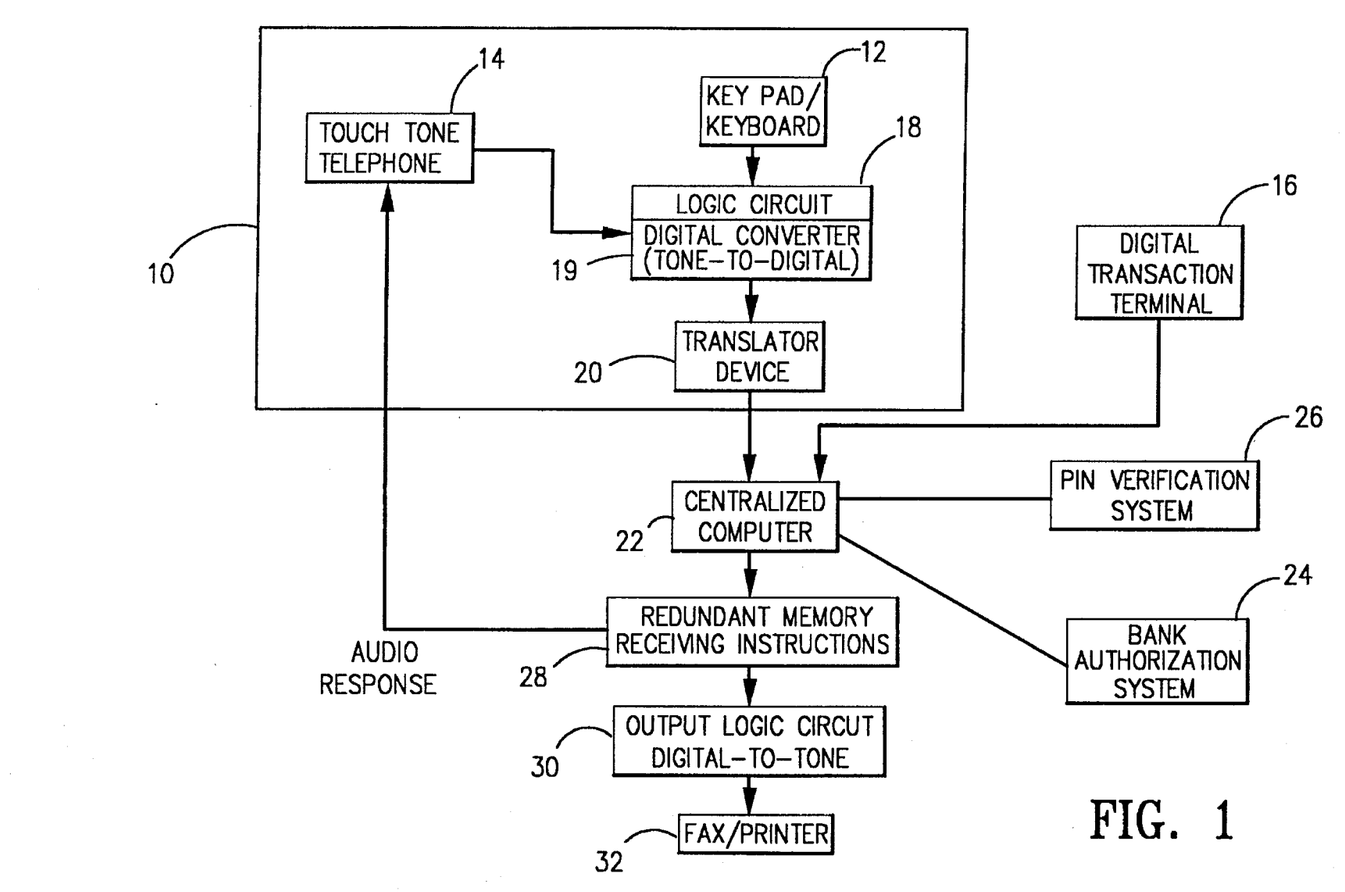
FIG. 1 is a functional block diagram of the apparatus and interconnection of the invention.

Referring to FIG. 1, which illustrates an exemplary embodiment of an apparatus and interconnection configuration of the invention, one embodiment of the invention includes a data or information entry station 10 comprising a keypad/keyboard 12 or a touch-tone telephone 14 connected by a suitable line to a logic circuit 18 which can include a supervisory electrical, digital or tone-to-digital converter 19. By example, an alternative data entry station in this embodiment could be a standard digital transaction terminal 16. The tone or digital converter 19 may be a conventional analog-to-digital converter or a signal processor. Depression or other actuation of the various buttons on the keyboard 12 or the telephone set 14 produces discrete digital signals or frequency tones at a local terminal or over the interconnection lines. These discrete digital signals or frequency tones energize and close selected circuits within the logic circuit 18 or tone-to-digital converter 19. The output of the digital terminal 16 or logic circuit 18 is routed to a translator device 20 which converts the selected circuit within the digital terminal or tone-to-digital converter into meaningful control and data signals capable of controlling a central computer 22.

The translator 20 receives the digital information and produces a number of discrete signals responsive to the digital or tone signals. The digital or tone signals are produced by the user in the form of entry data or information.

The digital or tone-to-digital converter 19 may be such as that disclosed in U.S. Pat. No. 3,647,973. The converter includes means for selectively connecting to a plurality of output circuits. Selected pairs of the output circuits are connected by single actuation of selected digital or tone signals on the keyboard. The translator is preferably responsive to selected circuit connections to produce the discrete signals.

The translator of U.S. Pat. No. 3,647,973 includes a decoder having a plurality of input conductors connected with the output circuits of the digital or tone-to-digital converter and a plurality of discrete decoder output lines. The translator also includes selective logic circuits coupled to the discrete input conductors for selecting the discrete decoder output lines in response to the selected connection at the output circuits of the digital or tone-to-digital converter.

A centralized computer system 22, as part of the global network receiving the discrete signals, comprises a mainframe network computer which includes means for accessing a plurality of secondary computer networks. For example, a centralized computer system 22, as part of the global network, can connect to a bank or other financial institutions 24 or government agencies for authorizing a selected transaction. Suitable identifying and verification systems 26 redundant memory 28 and reverse account matching computer system, well known in the art, also are connected to a centralized computer system 22, as part of the global network.

A centralized computer system 22, as part of the global network, is able to receive the data or information commands from the digital converter and process the information and produce output signals. The output signals are then produced by a centralized computer system 22, as part of the global network, which is connected to an output logic circuit 30 which can directly transmit digital output signals over digital lines. The output logic circuit 30 can also include a digital-to-tone converter that converts the output signals into tones for transmitting over telephone lines or a tone-to-digital converter for transmitting digital signals. The network also is interconnected to a selected remote printer unit 32 for printing a document corresponding to the processed information.

Figure 2:
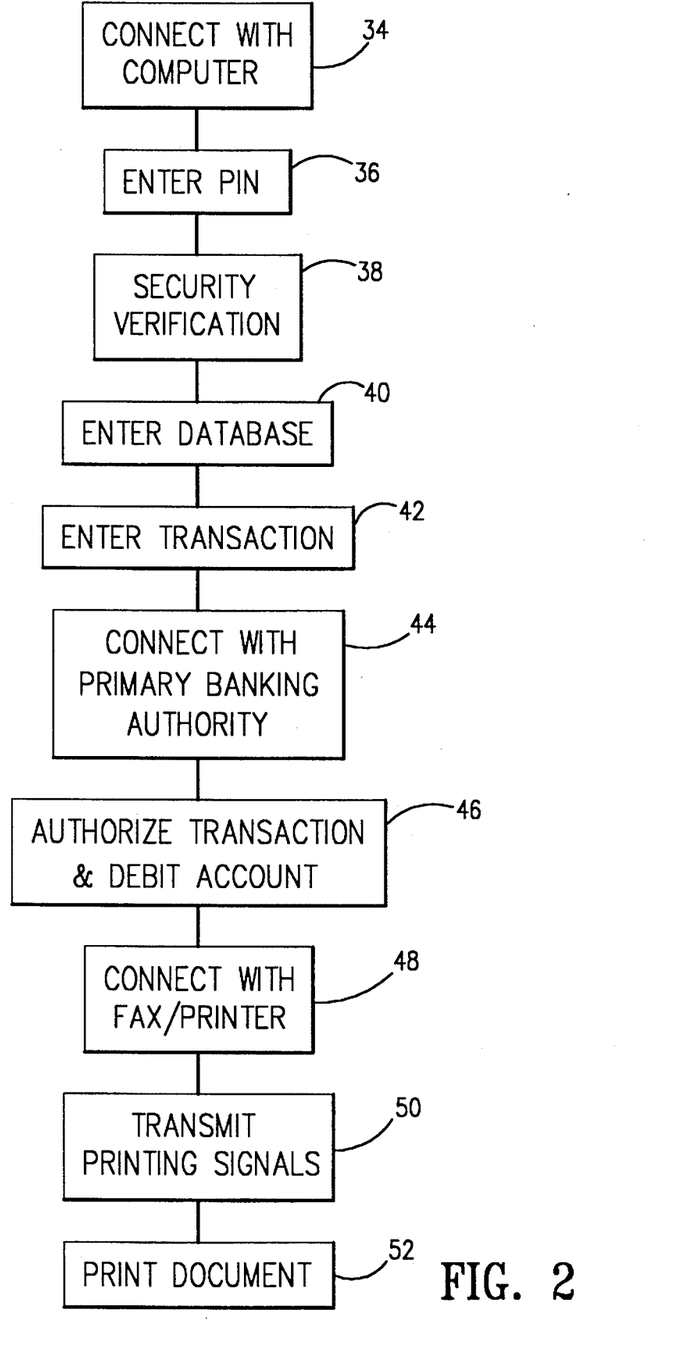
FIG. 2 is a flow chart of the overall system operation.

In operation of the system, as illustrated in the system operation diagram of FIG. 2, information is entered into the global network computer system by actuating selected keys to produce signals representing the input information. These signals are then translated by the logic circuit into computer commands and data signals which are directed to the central computer where the signals are processed. The processed information is converted to output control signals which are translated into printing signals or control signals. The printing signals are then routed to a printer unit where the document corresponding to the desired document is printed. In one embodiment, the computer includes means for monitoring the system by sending electrical or audio signals to the keyboard or to a telephone set indicating the operation of the computer in response to the computer commands and control signals.

The construction of the central computer will be dictated by specific needs and intended use of the system. Actual construction can use a number of different computers as known in the art.

In a preferred embodiment of the invention, the keyboard is a conventional transaction terminal or a Touch-Tone telephone set. In alternative embodiments of the invention the keyboard may be a separate computer and modem system such as a personal computer for home or office use. By using a personal computer with a keyboard, suitable software can be used to dial and connect to the central computer. In addition, the desired information can be entered into the personal computer which can then be transmitted to the central computer. In fact any type of computing device may store account information in its memory on a long term basis. Only transaction data would need to be entered in this embodiment. The computing device could take the form of any kind of personal computer, any kind of telephone with added features, a personal digital assistant or local telephone company equipment. The local phone company could offer a store and forward service for customer data. Data entry also can be accomplished via voice activated circuitry. Computing or other electronic devices can be remotely programmed with customer data in order to simplify the device and make the process easier for the customer. The programming may be accomplished by a technician using a touch tone telephone keypad or by another computing device.

Much of the World and United States population do not have credit cards, debit cards or checking accounts and still deal in cash for small and large transactions such as utility and rent payments. The current invention does not exclude the use of magnetic card stripe readers for data entry such as account number and name. A card reader may be embedded in an ATM machine, a telephone, or any computing device for this purpose. However, the greatest convenience is gained by using a touch-tone telephone keypad for all types of user data entry. The keyboard in the form of a touch-tone telephone is advantageous as the central computer can be accessed from an infinite number of world wide remote locations. Moreover, the information can be entered into the global network computer system without the need to have access to a home computer or other terminal.

The data entry techniques discussed in the previous sections regarding prior art are intended to be exemplary of suitable means for entering data and information to a centralized computer system 22, as part of the global network. The alpha data entry system as previously discussed may be a standard computer keyboard connected to a personal computer.

The operation of the present invention is described below with reference to FIG. 2. The user enters appropriate data and information through the data entry station to connect the station with a centralized computer system 34, as part of the global network. In the embodiment of the invention utilizing a Touch-Tone handset as the data entry terminal to connect with the global network computer system, the telephone number of a centralized computer system, as part of the global network, is dialed directly. Once initial connection is made with the computer system 34, the requisite entry codes are transmitted 36 through the telephone handset to access the selected computer data base 40. An advantage of being able to enter alphanumeric data over numeric only from a telephone touch tone keypad, is that a far greater number of PINs or Personal Identification Codes (PIC)s or passwords can be used. Four digits of numeric only data is limited to 10,000 combinations (i.e. 0000 to 9999) whereas four characters of alphanumeric data has 4 to the power of 36 combinations, ergo, over one million combinations. In general it is easier to remember an alpha sequence that has some significance, such as a person's name, than it is to remember a numerical sequence. When a computer terminal is used as the data entry terminal, the computer includes a modem to connect to the central computer. In preferred embodiments of the invention the user is required to have a suitable Password or Personal Identification Number (PIN) to enable the user to access the selected data base of a centralized computer system, as part of the global network. A centralized computer system, as part of the global network, preferably will have suitable security systems 38 to prevent unauthorized access. These security systems may include, for example, a series of prompts, each requiring an appropriate response to avoid automatic disconnection with a centralized computer system, as part of the global network.

Once the user has accessed the computer, appropriate data and command information is entered to select the desired transaction 42. Exemplary transactions may include transferring money from one account to another, withdrawing legal currency, i.e. FAX Cash™, and debiting the selected account in the amount withdrawn, paying bills, and drafting official documents. For customer convenience one embodiment will include a database or directory, such as a telephone book, which contains the bank number (e.g. ABA number) and the payee bank account number for all businesses and individuals who want to receive electronic fund transfers. The account may be a "receive only" bank account for customers who do not wish to publish their general account number. The payees bank account number also may be printed on their statement or bill. An individual when paying a bill, having gained access to their account, will simply enter the payee's bank's ABA number plus the payee's account number and the amount. The date is entered automatically and a bank statement can contain payee information as opposed to amount only. The current cost for processing a conventional check is around $1.50. The cost of electronic funds transfer is around $0.01 plus the cost of a telephone call. This invention also eliminates check fraud. More importantly it provides for a cashless society.

For further cost reductions and convenience an additional embodiment will involve electronic billing. It will operate similar to current electronic mail and will then operate more readily with the use of a computer terminal. A touch-tone keypad could be used to operate a computer and software with voice response. The recipient will associate the billed item with one of their bank accounts and authorize payment by means of current art software control. No paperwork and very little data entry is required. The physical electronic billing address can be local to the user, a remote service site similar to current electronic mail networks such as Internet, or at the user's banking institution. An additional benefit of the previously described authorization process is that direct deposit transactions by employers to individuals can take place instantaneously avoiding the paper work delays which are currently experienced.

Depending on the transaction directed to be performed, a centralized computer system, as part of the global network, will automatically dial and connect with secondary or auxiliary computer systems required to complete the designated transaction. Such auxiliary or secondary computer systems can include banks 44, credit card processors and lending institutions, government agencies or other financial institutions. The secondary computer system includes means to verify accounts and process the information necessary to permit completion of the transaction 46. The secondary computer system further includes suitable software to produce an authorization signal and to proceed with the transaction. The authorization signal is transmitted to a centralized computer system, as part of the global network, thereby enabling the processing of information and completion of the transaction. Once authorization is provided, a centralized computer system, as part of the global network, processes the necessary input data and produces output data and information corresponding to the transaction. The output data is instructed by the user to be transmitted to a selected location 48. The user can instruct the output data to be sent to a location remote from the keyboard or to the same location.

In a particularly preferred embodiment of the invention, a centralized computer system, as part of the global network, is adapted for receiving input data and information from the user, processing the input data and information and sending output data 50 and information to a printer unit for printing a desired document 52. In preferred embodiments, the printed document is legal currency or other negotiable instruments such as money orders, traveler's checks and the like. In alternative embodiments, the printed document may be security, photograph, graphic reproduction such as fingerprint, tickets and the like. The nature of the legal currency or negotiable instrument that the current invention can produce is varied as already stated. The items previously listed are conventional and some rely largely on the complexity of the printing to prevent fraud.

As an alternative to print complexity, special data specific to the instant transaction can be included in the document. The data is recorded in the central computer for later verification of the authenticity and therefore redeemability of the document. The data can take the form of customer data in the form of optical, magnetic, optomagnetic barcodes or other indicia can be printed directly onto a document to help prevent fraud. The barcodes can be read at places of business such as grocery stores and banks for verification and transaction tracking. The Password, PIN or PIC is maintained in the central computer and correlated to the bar code. The barcode does not include the Password, PIN or PIC number, for security reasons. The bearer will enter the Password, PIN or PIC with the redeemer at the time of redemption of the document. The Password or PIN can be verified directly through comparison with the central computer since it is correlated to the barcode alternatively the PIN/PIC can be verified by contacting the bank contained in the barcode data via the banking computer network.

By provision of this data verification, falsely printed documents will not be recognized by the central computer system and will not be redeemable and will therefore be valueless.

Once redeemed, the value of the document is transferred to the redeemer's account and the document can be shredded once the transaction is completed. It could however not be reused since the computer system would list it as having been redeemed. Legal currency or a negotiable instrument produced by the current invention can easily be invalidated and replaced in the case of it being lost or destroyed. With the current invention the original is in the computer data base which provides a sound audit trail.

For customers who do not have bank accounts the Password or personal identification number used may be a social security number, birth date or some other easily recalled piece of data. As an example, the documents may be printed by a payroll office or printed by a company's bank, as a service to company employees who do not wish to carry cash.

The barcodes can either be an extension of the current standard used for grocery items or the point of sale operator will make a keyboard entry to indicate that legal currency or a negotiable instrument is to be read.

The data encoding of course is not limited to barcodes and optical readers. If the level of identification required for the value of a particular legal currency or negotiable instrument is beyond the capabilities of the barcode system then other media and readers may be utilized. The encrypted data contained on the legal currency or negotiable instruments can be digitized images of hand written signatures, voice signatures, DNA signatures, photographs and fingerprints. The data can then be verified with the bearer when a transaction takes place.

Figure 7:
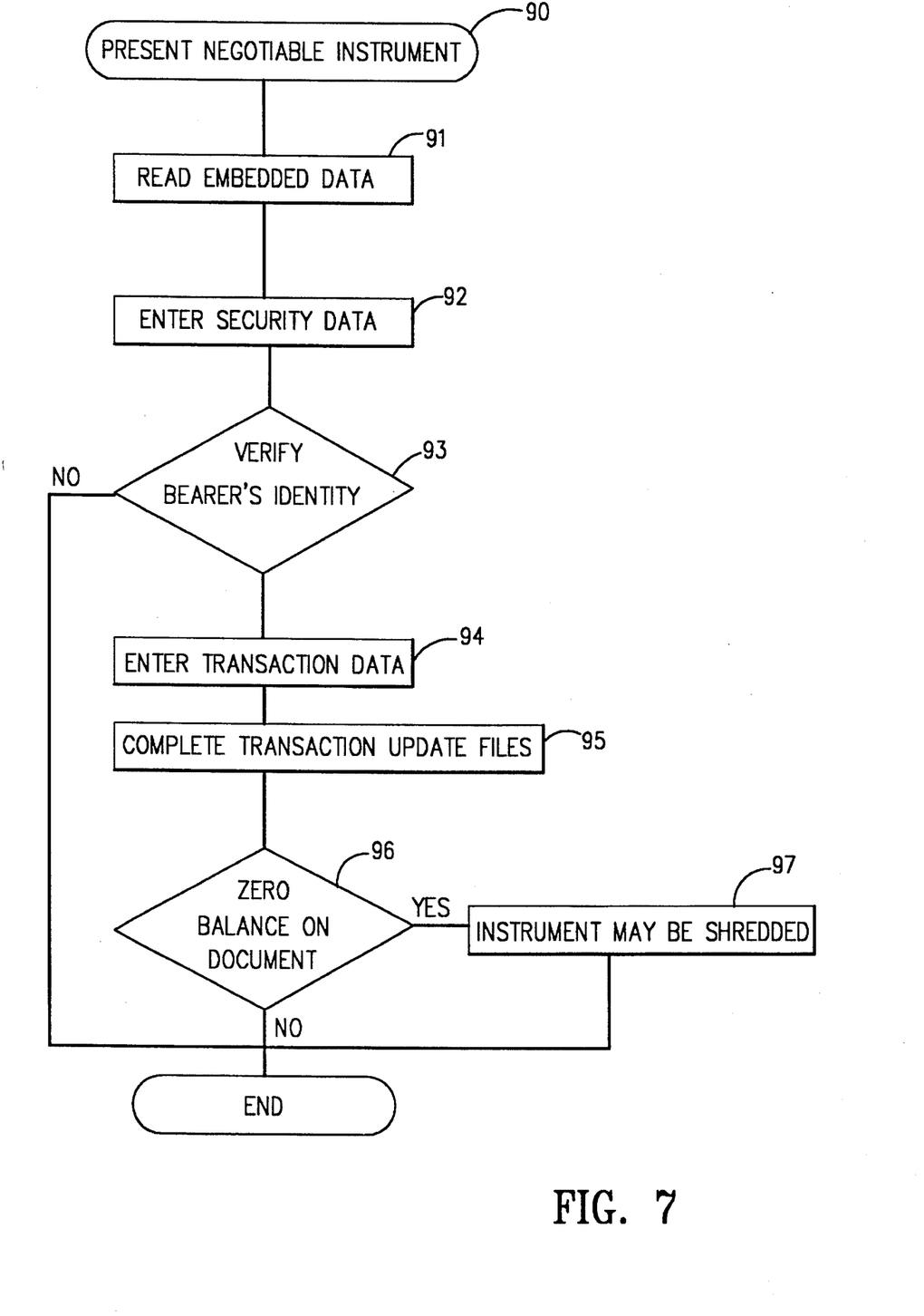
FIG. 7 is a flow chart of the computer program for redemption of legal currency or a negotiable instrument.

FIG. 7 is a flow chart of the computer program for redemption of legal currency or negotiable instrument. The legal currency or negotiable instrument is presented 90 by the bearer to the payee at a location with the capability of reading the embedded data. The embedded security and other data, which may include verification of the document value, are read 91. The bearer enters any required Password, PIN or PIC. 92. The bearer's identity is verified by the appropriate means 93. If the bearer's identity and the document data conform, this operation is successful and then additional transaction data are entered 94 either manually or automatically. The transaction can then be completed 95 by updating all records. A check to see if the complete value of the legal currency or negotiable instrument is used for completing the transaction is performed 96. If this is true then the document may be shredded 97.

Figure 5:
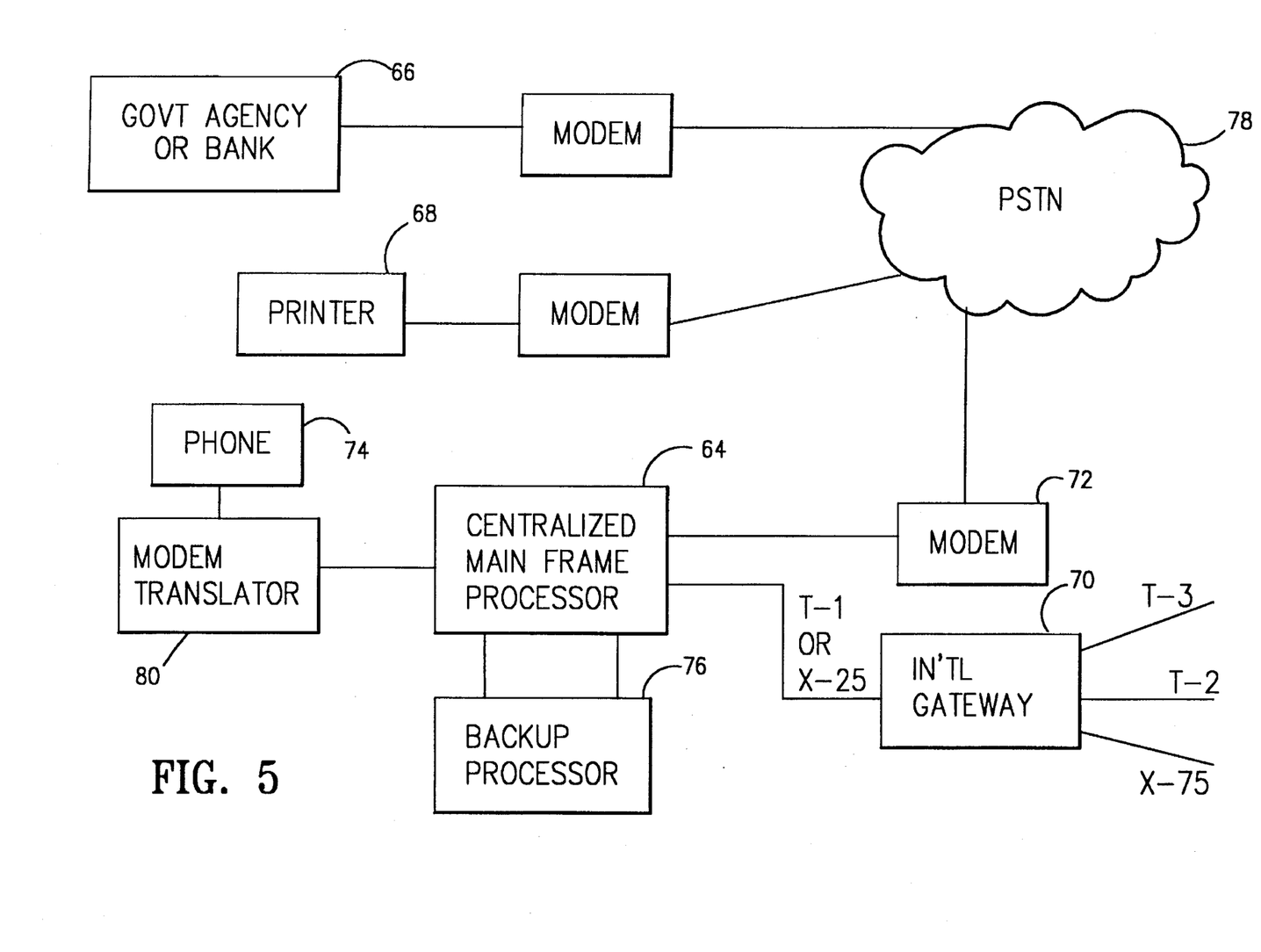
FIG. 5 is an example of a network diagram.

In the embodiment of the invention for printing legal currency, as illustrated in FIG. 5, a centralized computer system 64, as part of the global network, will include an appropriate gateway to a secondary computer system of a government agency 66 for obtaining authorization to print the legal currency in the designated denominations. Prior to 1851 U.S. legal currency was printed by private industry. This also is currently the case in many other countries. Data processing is not a primary function of Government. The return of legal currency production and printing to industry is not only achievable but economically advantageous and efficient. Once the government agency, such as the U.S. Treasury Department, authorizes the transaction, the user's bank account will be debited accordingly. Upon receiving the requisite authorization signal via the FAX Cash™ gateway to the secondary computer systems 66, a centralized computer system 64, as part of the global network, will continue to process the information and produce the output signals for printing the authorized legal currency.

A centralized computer system 64, as part of the global network, will then connect to a designated printer 68. The output printing signals will be transmitted and the legal currency will be printed. The legal currency can be printed in any authorized denomination or country's legal currency. When a foreign legal currency is to be printed, the secondary authorizing computer system will comprise an appropriate international gateway 70 to that government's authorizing and foreign exchange system for obtaining authority to print the legal currency at the appropriate exchange rate. In this manner, a centralized computer system 64, as part of the global network, can be used as a global financial and foreign exchange system. The ability to request and have printed foreign legal currency or negotiable instruments directly from one's own bank account bypasses the need for manual conversion calculations and agents fees. It also improves the situation where too much legal currency is converted and a fee also is charged to convert it back again.

In preferred embodiments of the invention, the printer 68 is a facsimile machine, automated teller machine printer, or a high resolution laser printer. A centralized computer system, as part of the global network, includes appropriate means such as modem 72 for dialing and connecting to a designated printer at any location. For security protection, suitable prompts requiring specific responses can be given before the legal currency will be printed. When a facsimile machine is used to print the legal currency, the machine may be a standard facsimile machine or a machine adopted to print small size pieces of paper corresponding to the required size for the designated legal currency. The printer can further print vertically or horizontally and on both sides, and in color.

In a preferred embodiment the printer is a facsimile machine having a telephone hand set as an integral part thereof or without a handset and having a suitable connection for connecting to a standard handset. In this manner, the user can use the handset to input the required data and information and instruct the legal currency or other document to be printed by the facsimile machine.

In further embodiments, a centralized computer system 64, as part of the global network, is connected via a gateway to a secondary computer system 66 of a financial institution for authorizing the printing of legal currency, checks, money orders or travelers checks. These documents can be directed by the user to be printed at any location or any selected printer in essentially the manner as discussed above.

A centralized computer system 64, as part of the global network, includes a print file capable of storing digitized images of the legal currency in selected denominations or other documents to be printed. The digitized images can be in a number of different languages to enable printing of different currencies.

It will be appreciated that suitable means are required to prevent fraudulent and unauthorized use and entry of a centralized computer system 64, as part of the global network. An appropriate identifier means can be included in the computer system to identify the telephone number of the connection being used by the data entry station 74. A permanent record of the location of the user and the destination location of the output signals can be made. In one form of security system, the central computer will disconnect from the user, record the telephone number, and call them back at the registered number identified by the security telephone number identifier. The central computer further may require specific identifying information in response to prompts. Data encryption techniques may include unique identification by photograph, fingerprint, DNA and user chosen alphanumeric passwords known to the bearer and stored in the central computer.

In one embodiment, the computer system includes a translator comprising an encoder unit and a decoder unit connected between the computer and the discrete decoder outputs of the decoder units. The actual circuitry within the encoder unit will be dictated by the needs of the particular computer system. The selection of a discrete decoder output line can be interpreted within the encoder unit as a specific command operation. As is apparent, there are a number of different control environments and computer devices which can be controlled by this system.

Figure 4:
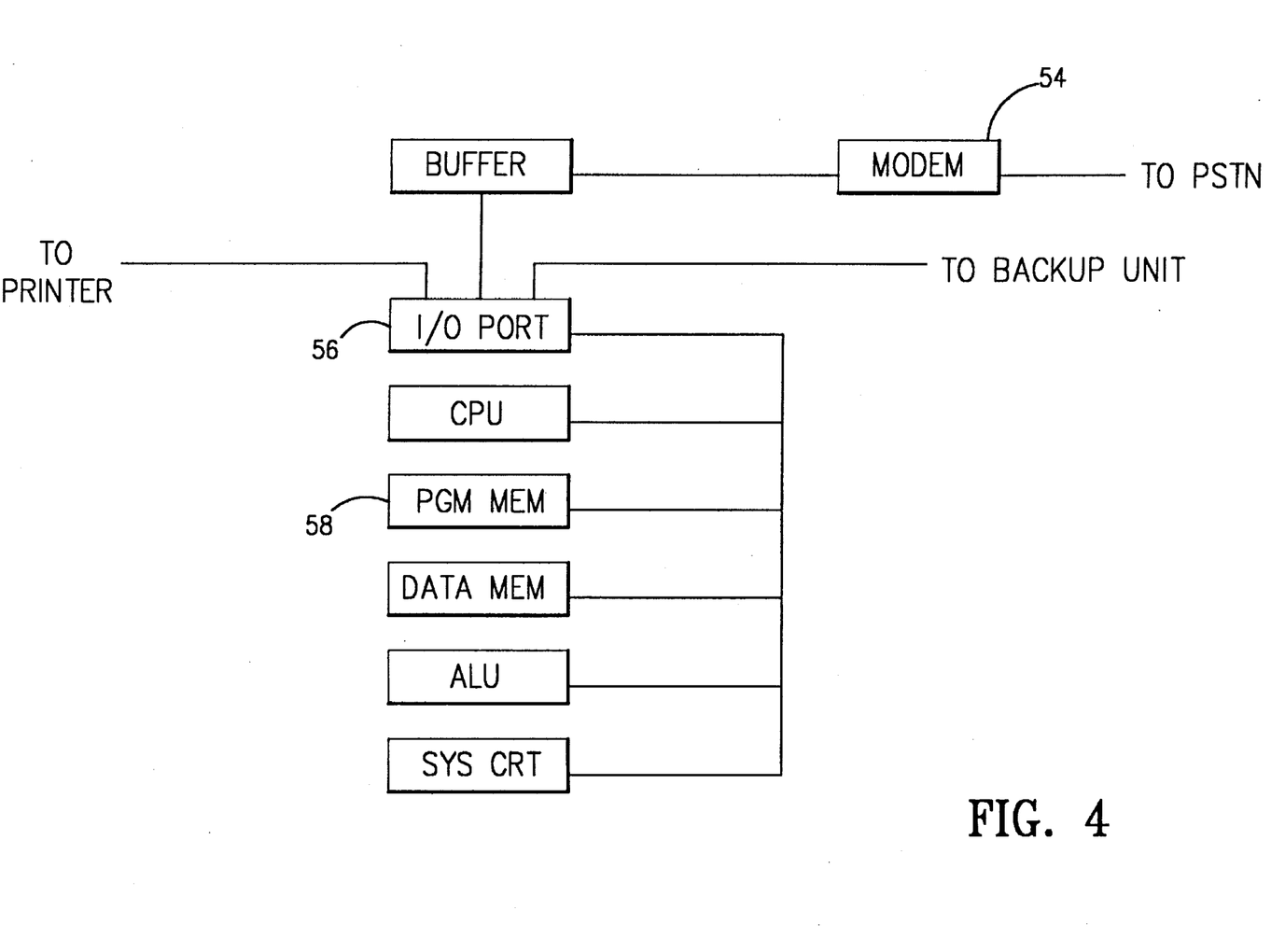
FIG. 4 is an example of a main frame block diagram.

As illustrated in FIG. 4, the main frame processor is the intelligence center of the system. Data from the modem translator computer arrives via the modem 54 and one of the I-O ports 56. The communication security protocol must be satisfied that the caller is a bona fide system user. The Password or PIN number must be correct. The Password or PIN number identifies the user, the user's phone number, and the users bank account number. The data contains the transaction type, the quantity and denominations of legal currency or negotiable documents to be issued or transferred, the location of the transfer and the location of the printing unit to rout the printing commands and data. The data further contains the account numbers to perform the accounting functions.

The program memory 58 contains the list of the proper government agencies required to authorize the transaction and the financial institution to assure the funds are available for the transaction. The system queries these agencies and institutions and only after correct response does it print the legal currency or documents at the prearranged printing unit, debit and credit the proper accounts, and forwards transaction notices to the principals.

The data and transactions are performed by both the primary processor 64 and the backup processor 76, FIG. 5. Only the primary processor 64 sends data to outside agencies, ensuring that the event of a failure will not be noted by the outside agencies as the backup processor 76 will, in the event of failure, take up the task at the next step in the system program. In addition to the two main frame computers shown in FIG. 5 a third off line computer is available to be powered up and assume the role of either of those shown when a failure is detected. This is common practice in current banking and lottery systems.

The current invention can employ a data storage media fault protection mechanism, at all stages of system operation. All transaction data received by computing devices in the system will be stored in two separate memory locations and a comparison run immediately. Any discrepancy will result in the transaction being aborted and a request for the process to be restarted. If an error occurs while printing legal currency or negotiable instruments then the document will be declared invalid.

Figure 6:
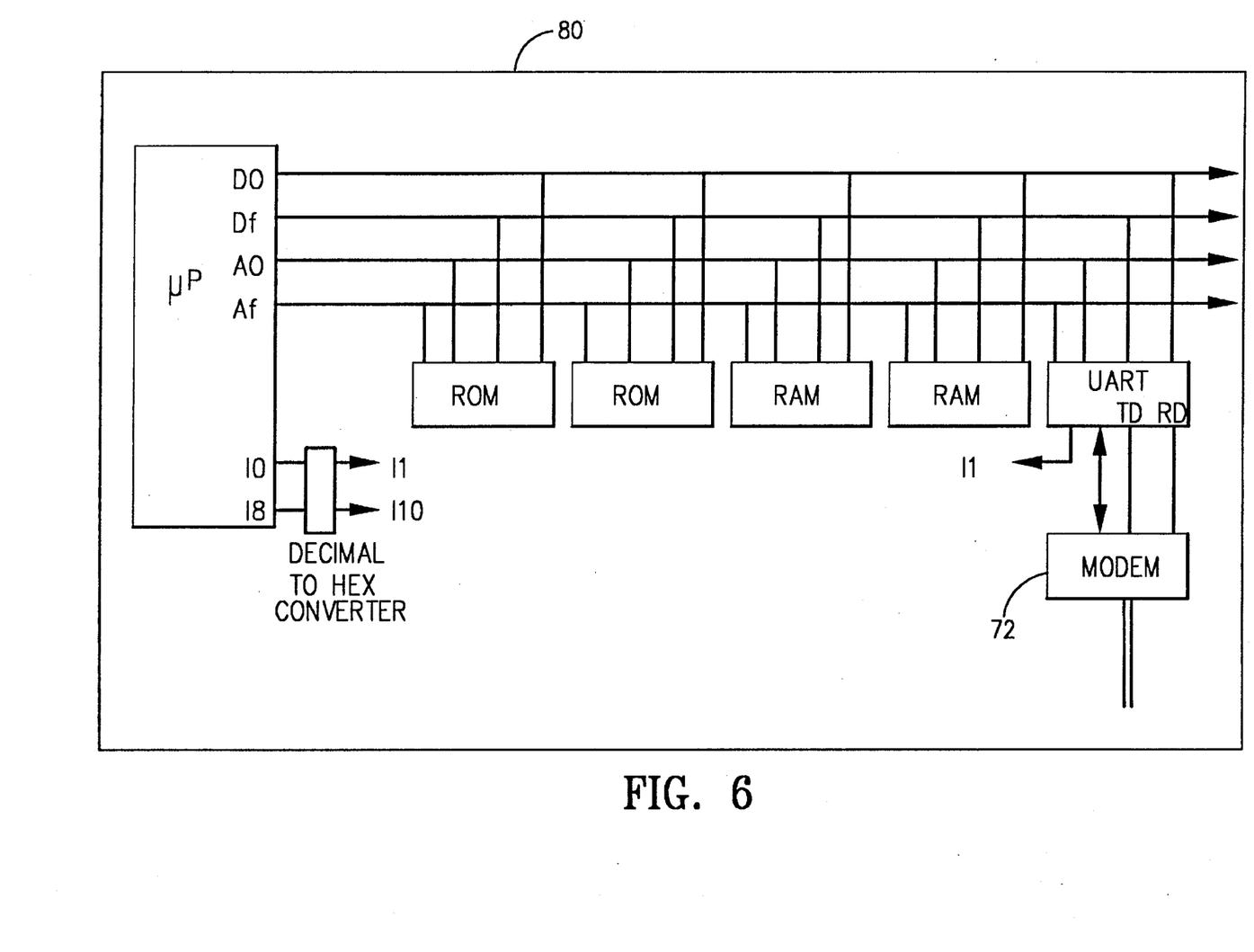
FIG. 6 is an example of a translator block diagram.

The configuration of the translator unit 80 for converting unit converts the telephone tone signals to digital signals corresponding to numbers and letters for transmission to the main frame computer 64 is illustrated in FIG. 6. The translator, unit 80 accepts the keyboard tone signals and decodes the numbers and letters using a 2 of 8 signal selector program and logic. The tone burst length is measured each time a burst is received to determine burst duration. Long bursts are designated for transmission, short bursts are designated for selection as was described above. The decoded characters are stored in RAM for transmission digitally to the main frame computer.

Transmission to the main frame computer is accomplished by accessing the public switched telephone network (PSTN) 78 via a modem 72. The translation unit 80 automatically passes the security data and transaction data from RAM.

In this way the party requesting the transaction communicates at human speed to the translator 80 and the translator 80 communicates at machine speeds with the main frame computer 64. The machine speeds are much faster than the human speed, therefor allowing the main frame computer 64 to service many calls in the time one caller can send one message.

Alternatively, the negotiable instrument can be redeemed by scanning at the redemption site. The scanned image is then transmitted into a central computer for verification. The central computer data base contains an electronic image of each authorized negotiable instrument and makes a comparison of the received scanned image for authentification.

After redemption of a negotiable instrument by any of the means above, the negotiable instrument is destroyed at the site of redemption and its electronic authorization is tagged as redeemed. In this manner redemption fraud is eliminated, as each negotiable instrument can be redeemed only once.

Figure 8:
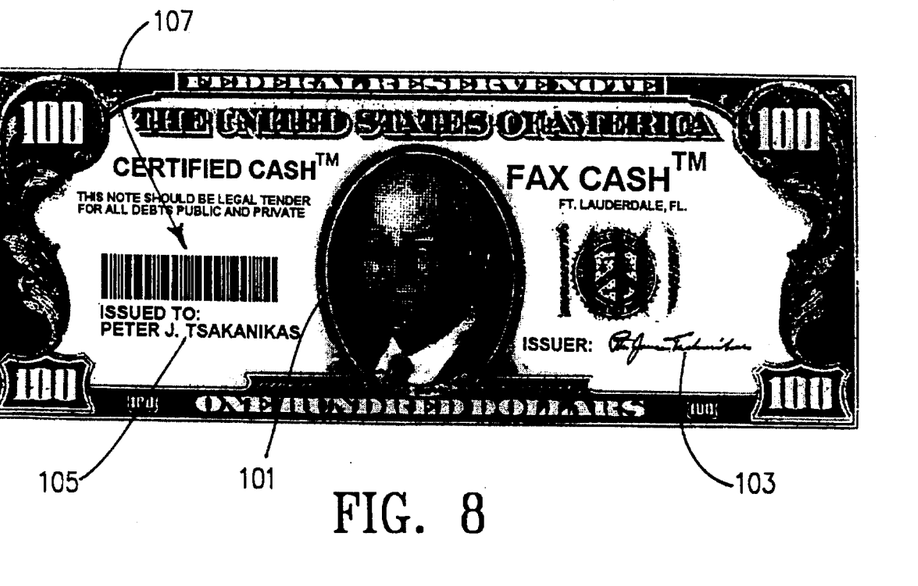
FIG. 8 illustrates an exemplary negotiable instrument with unique redemption indicia.

FIG. 8 illustrates an example of a negotiable instrument having various unique indicia thereon. For example the picture of the bearer 101; the bearer's signature 103; the bearer's name 105 and the bar code 107 are, in combination, unique to the negotiable instrument. The bar code alone is unique for each negotiable instrument, and the other indicia enable quick identification of the bearer even prior to bar code reading or scanning of the instrument. Further, it is contemplated that other unique indicia for identification could be included in the negotiable instrument, for example but not limited to fingerprints, DNA data or other unique identifiable indicia.

Figure 9:
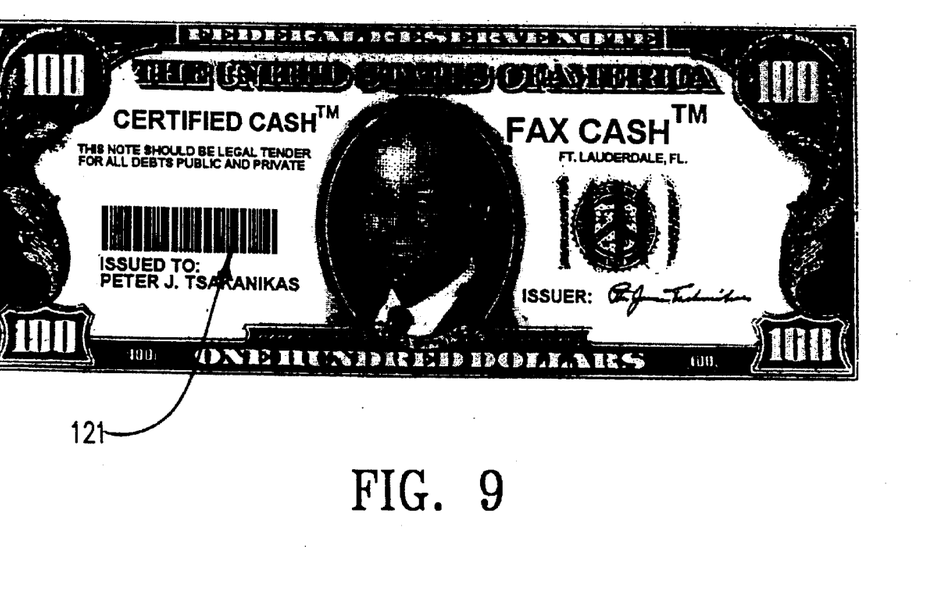
FIG. 9 illustrates an exemplary greenback $100 bill with a bar code printed thereon as taught in the present invention.

Another embodiment of this invention, as illustrated in FIG. 9, is to have printed by the authorized printing agency such as the Bureau of Engraving, new bar coded legal currency including but not limited to $1, $5, $10, $20, $50, $100, & $1,000 bills. The new bar coded money would have all the appearances of conventional legal currency with the exception that a bar code is embedded on the printed legal currency to establish the unique aforementioned information relating to the specific denomination of legal currency printed. Additionally, the same identification information on legal currency can be utilized in the printing of food stamps so that only authorized recipients of food stamps can redeem them at an authorized POS. This would also be accomplished by utilizing the reverse account matching information at the point of redemption which would permit the recipient of food stamps to attest that the proper person is redeeming the food stamps at a POS. Another embodiment of the invention would allow the same method to be used for identifying other items or goods such as batteries, auto parts, and airbags, which can also have bar coded information engraved on the product. The bar coded information can then be read optically by optical scanners and or hand held optical wands which would automatically and instantaneously feed the origin of the items and goods into the computer. For example, if an airbag was stolen out of a vehicle, the engraved bar code on the airbag would be able to be read to eliminate the possibility of fraud by unethical auto mechanics that would utilize stolen property to be used in repairs or in installations thus charging the insurance companies astronomical amounts for stolen goods that they purchased at significant discounts or no cost to them. The problem here is twofold, in that insurance companies can be charged twice. Once by the victim of the theft, who will have to replace the stolen item, and once again, when the stolen part is charged as a purchased used or even new part.

The invention also includes the development of the hardware and software mechanism to print new money, as illutrated in FIG. 9, which will has embedded on it a bar code 121 that also includes information equivalent to a serial number to identify a unique piece of legal currency, for example a specific $1 bill or $100 bill.

The above description is intended to be exemplary of preferred embodiments of the invention and is not intended to limit the scope of the invention as defined in the following claims. It is readily appreciated that numerous embodiments can be made without departing from the scope of the invention.

What is claimed:

1. An information processing system for transferring negotiable instruments, comprising:

user input means having a plurality of actuatable members thereon for producing a plurality of signals having different characteristics corresponding to the actuation of said actuatable members, circuit means coupled with said user input means, responsive to the actuation of said actuatable members on said user input means for producing information signals, system processor means for receiving and processing said information signals, and producing document output signals corresponding and configured for unique identification of a preselected negotiable instrument document corresponding to said information signals and for retaining an indicia of said unique identification and code processor means connected to said system processor means for receiving said information signals and processing said signals to produce an authorization signal, and means for providing said authorization signal to said system processor means;

means for routing said output signals to second circuit means said second logic circuit means including converter means for converting said document output signals into document printing signals;

printing means coupled to said second circuit means for receiving said document printing signals and printing said negotiable instrument document in response to said document printing signals and including said unique identification.

2. The system of claim 1, wherein said circuit means further includes:

digital converter means for converting signals produced by said user input means into digital information, and translator means responsive to said digital information for producing said information signals and including decoder means connected with said digital converter means.

3. The system of claim 1 wherein said code processor means is capable of verifying sufficient funds in a bank account.

4. The system of claim 1 wherein said authorization signal is authorized by a government agency.

5. The system of claim 1 wherein said negotiable instrument document is a legal currency.

6. The system of claim 1 wherein said negotiable instrument document is a negotiable instrument.

7. The system of claim 1 wherein said negotiable instrument document is selectable from the group consisting of: legal currency, a stamp, a ticket and negotiable instruments.

8. The system of claim 1 wherein said printing means is a facsimile machine.

9. The system of claim 1 wherein said printing means is a laser printer.

10. The system of claim 1 wherein said system processor means includes security means for limiting access to the system.

11. The system of claim 1 wherein said user input means is a telephone at a location remote from said second circuit means and connected thereto by a telephone line.

12. The system of claim 11 wherein said printing means is at the same location as said telephone.

13. The system of claim 11 wherein said printing means is located remote from said telephone.

14. The system of claim 11 wherein said system processor means includes means to identify the location of said telephone.

15. The system of claim 1 wherein said system processor means includes means for obtaining authorization from a government agency for printing a legal currency, and means for converting a selected denomination of legal currency from a first country's legal currency to a second country's legal currency.

16. The system of claim 1 further including means for printing different denominations of legal currency.

17. An information processing system for generating negotiable instrument documents, comprising:

user input means for producing a plurality of document request signals, including user identification signals, input means identification signals and document valve signals;

circuit means coupled with said user input means for receipt of said document request signals and for producing document information signals corresponding to said document request signals, processor means coupled to said circuit means for receiving and processing said document information signals, and producing document output signals corresponding to a preselected negotiable instrument document corresponding to said document information signals and means for routing said output signals to second circuit means for converting said document output signals into document printing signals;

wherein the combination of said document request signals, said document information signals, said document output signals and said negotiable instrument document printing signals establish a unique identity of said negotiable instrument document which include signals indicative of the value of said negotiable instrument document and indicative of a security code corresponding to said negotiable instrument document which includes elements corresponding to said use and to said input means; and printing means coupled to said second circuit means for receiving said document printing signals and generating said negotiable instrument document in response to said document printing signals, wherein said negotiable instrument document includes:

indicia indicative of the value of said negotiable instrument document and indicia indicative of said security code corresponding to said negotiable instrument document.

18. An information processing system for generating negotiable instrument documents, wherein:

each document has a unique, registered, user specific identity, and is generically redeemable upon verification of said registration, said system comprising:

user input means for producing a plurality of document request signals, circuit means coupled with said user input means for receipt of said document request signals and for producing document information signals corresponding to said document request signals, processor means coupled to said circuit means for receiving and processing said document information signals, and producing document output signals corresponding to a preselected negotiable instrument document corresponding to said document information signals and means for routing said output signals to second circuit means for converting said document output signals into document printing signals;

wherein said processor means generates a security code, including integrated segments corresponding to said user, and to the value of said negotiable instrument, corresponding to said negotiable instrument document and registers said security code with a designated registration repository in a manner corresponding to said negotiable instrument document and includes said security code as a portion of said document printing signals; and printing means coupled to said second circuit means for receiving said document printing signals and generating said negotiable instrument document in response to said document printing signals, wherein said negotiable instrument document includes:

indicia indicative of the value of said negotiable instrument document, the identity of said user of said negotiable instrument document, and of said security code corresponding to said negotiable instrument document redemption means connected to said designated registration repository for allowing generic redemption of said negotiable instrument document through verification of said security code.

19. The information processing system of claim 18, further including means for document verification, comprising:

data input means for receipt of said value indicia, said identity indicia and said security indicia, and communication means for contacting said processor means to determine if said value, said identity and said security indicia correspond to a valid negotiable instrument document.

20. The information processing system of claim 19, wherein said data input means includes reader means for automated retrieval of said indicia from said negotiable instrument document.

21. The system of claim 1 wherein said second circuit means includes an automated teller machine.

22. The system of claim 21, wherein said printer is the printer within said automated teller machine.

23. The system of claim 21, wherein said printer is configured for external attachment to said automated teller machine.

* * * * *